TRIM CORRECTING APPARATUS FOR BOATS

Original Filed Aug. 18, 1966 2 Sheets-Sheet 1

INVENTORS
ROBERT E. YUNKER
JOHN P. SOUTHERN
BY Graybeal, Cole & Barnard
ATTORNEYS

TRIM CORRECTING APPARATUS FOR BOATS

Original Filed Aug. 18, 1966 2 Sheets-Sheet 2

INVENTOR.
ROBERT E. YUNKER
JOHN P. SOUTHERN
BY Arnold, Cole & Barnard
ATTORNEYS

United States Patent Office

Re. 27,258
Reissued Dec. 28, 1971

27,258

TRIM CORRECTING APPARATUS FOR BOATS

Robert E. Yunker, West Sacramento, Calif., and John P. Southern, Seattle, Wash.; said Yunker assignor to Delbert J. Barnard, Seattle, Wash.

Original No. 3,313,262, dated Apr. 11, 1967, Ser. No. 573,380, Aug. 18, 1966. Application for reissue Apr. 10, 1969, Ser. No. 860,442

Int. Cl. B63b 7/28

U.S. Cl. 114—66.5 19 Claims

Matter enclosed in heavy brackets [ ] appears in the original patent but forms no part of this reissue specification; matter printed in italics indicates the additions made by reissue.

*ABSTRACT OF THE DISCLOSURE*

*An inflatable bladder is positioned between a stern located support and a lift member swingable downwardly from a position substantially level with the bottom of a boat into a downwardly and rearwardly sloping position. Inflation of the tube causes it to press against the swingable member and deflect it downwardly.*

*CROSS-REFERENCE TO RELATED PATENT APPLICATIONS*

*Our application 573,380, which issued as U.S. Patent No. 3,313,262, of which this is a reissue application, was* [This is] a continuation-in-part of our copending application Ser. No. 488,705, filed Sept. 20, 1965, and entitled Automatic Trim Correction [.], *now U.S. Patent No. 3,298,344, issued Jan. 17, 1967.*

The present invention relates to trim correcting apparatus for boats, and more particularly to such an apparatus including outboard lift members for changing trim by water reaction, and inflatable bladder means for moving water reaction surfaces of such members into operational positions.

In the operation of boats, it is highly desirable to be able to exercise some control over the fore and aft and lateral tilting movements of the boat during forward travel of the same. Various devices for controlling such tilting movements have been heretofore proposed, typical examples of which are disclosed by: Bennett, U.S. Patent No. 3,062,167; Jacobs et al., U.S. Patent No. 3,001,499; Sherrill, U.S. Patent No. 3,046,928; Curtis, U.S. Patent No. 3,058,442; Frederick, U.S. Patent No. 3,159,131; and Sherrill, U.S. Patent No. 3,177,837. Each of these patents discloses trim correcting means comprising a pair of generally horizontal water reaction panels, one on each side of the center line of the boat. Each panel is hinged along its forward edge to the boat substantially at the level of the undersurface of the boat. Means are provided for pivotally moving each panel about its hinge means, from a retracted inactive position downwardly to an active position, wherein it slopes downwardly and rearwardly from the undersurface of the boat's bottom.

A principal object of the present invention is to provide a trim correcting system of the same general type as those disclosed by the above-mentioned patents, but in which a novel fluid pressure actuated expansible chamber means is used for moving each water reaction panel downwardly from its inactive position to its active position. Briefly, the fluid supply system comprises an inboard source of fluid under pressure; supply conduit means leading from such source and outboardly to each expansible chamber means, and including a separate inlet conduit leading into each expansible chamber means; and a normally closed off-on valve in each inlet conduit.

In preferred form, the expansible chamber means comprises a hermetically sealed inflatable tube member interposed between the water reaction panel, and a fixed support [there for] *therefor* spaced above the water reaction panel. Preferably, the fixed support is an attachment to the boat's transom and includes a generally horizontal shelf, and the inflatable tube means includes at least one upwardly extending stem, through an opening therefor in the shelf portion of the fixed support.

Another object of the present invention is to provide a trim correcting device composed of a rigid bracket having an upstanding front wall by which it is mounted onto the lower portion of the transom of a boat, and a fixed shelf integral therewith, extending rearwardly from the lower portion of said front wall; and a reactance member secured to the transom below said bracket, with both the bracket and the reactance member being constructed from a synthetic resin or plastic. The lower portion of the front wall of the bracket may be offset rearwardly from the upper portion of such bracket, and the reactance member may include an upstanding front wall, the upper portion of which is positionable between the transom and the lower portion of the front wall of the bracket, and is securable to the transom in a position of coplanar parallelism with the upper portion of the front wall of said bracket. The reactance member may also include a relatively narrow support strip extending rearwardly in fixed position from the lower portion of the front wall of said reactance member; a relatively large water reactance panel of rectangular proportions disposed rearwardly of said support strip, and spaced below the shelf of said bracket; hinge means pivotally connecting the water reaction panel to the support strip; and a rear wall or flange that extends upwardly from the rear edge of the water reaction panel. The inflatable tube means, which is constructed from rubber or a rubber-like material, is in such embodiment of the invention bounded at the top by the shelf, at the bottom by the water reaction panel, at its front by the front wall of the reactance member, and at its rear by the upstanding rear wall of the reactance member.

A further object of the present invention is to provide a trim correcting device of the character described wherein the principal components are made from non-corrosive materials, and wherein such components are interrelated and arranged in such a manner that the metallic fastener and/or coupler elements used with such device do not contact and are not situated in close proximity to a metal part, resulting in galvanic corrosion being no problem.

Yet another object of the present invention is to provide an outboard trim correcting device connectable to a boat generally rearwardly of its transom, and comprising a support member of dihedral form formed from sheet plastic and comprising dihedrally related first and second panel parts joined together along an apex line, and a plurality of strengthening gussets spaced along said member and interconnected between said panel parts, to provide rigidity to said dihedral member, said gussets being generally U-shaped in cross-section; means for connecting said dihedral member to a boat, with its apex line positioned adjacent, and [genenally] *generally* parallel to, the lower edge of the boat's transom; and an elongated section of flexible tubing extending along and contacting one panel part of said dihedral member, on the side thereof opposite the gussets, and at a location offset from said apex line, said section of tubing including means closing and hermetically sealing same, and at least one conduit connection.

Still a further object of the present invention is to provide a trim correcting device of the character described comprising, as a principal element thereof, an inflatable bladder of elongated tubular form, and including means hermetically sealing same, and at least one conduit connection, such as an outstanding stem. Preferably, the bladder is a section of hosing, which when full has a substantially round cross-sectional shape. The hosing is cut to the desired length, and the two end portions thereof are flattened and closed, and are hermetically sealed in such flattened condition. The inflatable bladder may be secured in position by means of at least one connector. such as a screw or a bolt, inserted through one of the flattened end portions, with at least the largest part of such bladder being unrestrained between its ends against expansion and contraction.

These and other objects, features, and advantages of the present invention will be apparent from the following description, appended claims, and annexed drawings.

Referring to the drawings wherein like reference characters designate like parts throughout the several views:

FIG. 1 is a perspective view taken from above and looking generally to the rear of a boat equipped with a pair of trim correcting devices typifying the present invention;

FIG. 2 is a fore and aft sectional view, on an enlarged scale, taken through an intermediate portion of one of the trim correcting devices, including a solid line showing of the reactance member and the inflatable tube member in inactive positions, and a broken line showing of such members in active positions, wherein the inflatable tube member is inflated and the water reaction panel of the reactance member slopes downwardly and rearwardly from the bottom of the boat;

Figure 1:
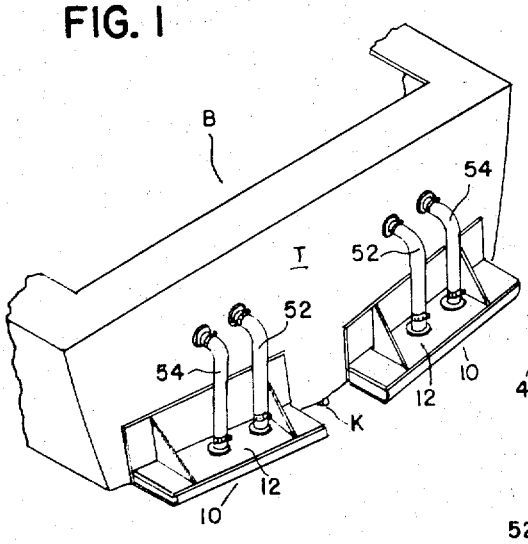

Referring more specifically to FIG. 1, a pair of trim correction devices 10, constructed according to the present invention, are shown attached to the lower portion of the transom T of boat B, in symmetrical relationship on opposite sides of the boat's keel K.

Each trim correction device 10 is shown to comprise a rigid mounting bracket 12 having an upstanding mounting wall 14 and a rearwardly extending, generally horizontal shelf 16. Triangular brace members 18, or the like, extending between the mounting wall 14 and the shelf 16, give rigidity to the mounting bracket 12. A plurality of openings, some of which are designated 20 in FIG. 3, may be provided in the mounting wall 14, for receiving bolts 22, or the like, used for securing the bracket 12 to the transom T.

Figure 2:
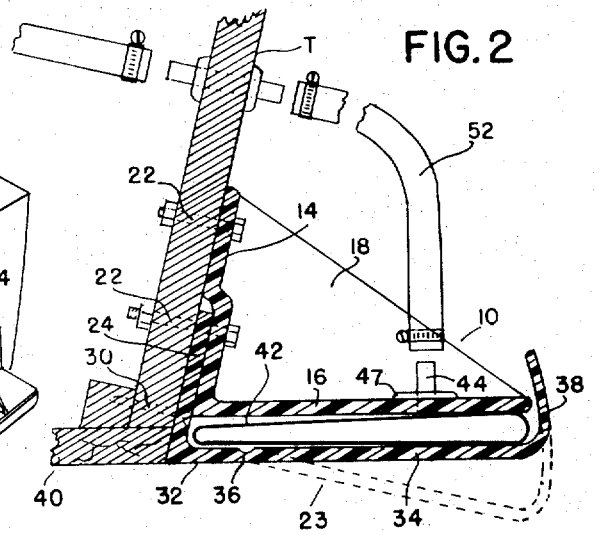

As clearly shown by FIG. 2, a reactance member 23 is mounted on the transom T below bracket 12. The lower part of the bracket's mounting wall 14 is preferably offset rearwardly of the upper portion, so as to provide space between it and the transom T, in which space the upper portion of the forward wall 24 of the reactance member 23 may be situated, substantially in coplanar parallelism with the upper portion of wall 14 (FIG. 2). A plurality of openings 26 are provided in the upper portion of wall 24, and are appropriately located so that they are registerable with the openings 20 in the lower part of wall 14. Thus, some of the fastening bolts 22 may extend through both an opening 20 in wall 14 and an opening 26 in wall 24, and serve to secure both the mounting bracket 12 and the reactance member 23 to the transom T. Additional openings 28 may be provided in the lower part of wall 24 for the reception therein of screws 30, or the like.

In addition to front wall 24, the reactance or lift member 23 comprises a narrow support strip 32 forming a near right-angle corner with wall 24, a generally horizontal water reaction panel 34, a hinge 36 interconnecting the water reaction panel 34 with the support strip 32, and a rear flange 38 upstanding from the rear edge of panel 34 and terminating substantially at the level of, or somewhat above, shelf 16. As shown by FIG. 2, the hinge 36 is located substantialy at the level of the undersurface of the bottom 40 of boat B. Also, the trim correction device 10 is positioned on the transom T with the water reaction panel 34 substantially at the level of the undersurface of the bottom 40. Reactance member *23* includes an upper action surface which, relative to the hinge line, is angularly above the lower water reaction surface.

Preferably, both bracket 12 and reactance member 23 are constructed from a synthetic resin, a typical resin being polymerizable unsaturated polyester, for example. The hinge 36 may merely be a reduced thickness portion of this material, as is illustrated. At least bracket member 12 may be fiber glass reinforced.

A hermetically sealed tube, bag or flexible walled container 42 of a resilient, rubber-like material is provided in the space defined on top by the shelves 16, or bottom by the water reaction panel 34, at front by the lower portion of wall 24, and the rear by the upstanding rear flange 38. As used herein, the term "rubber-like material" means any material having the properties of the rubber used in inner tubes for pneumatic motor vehicles tires, and any equivalent materials capable of being inflated when formed into a closed container, and capable of substantially returning to its original shape when the inflating fluid pressure is released. Preferably, the tube 42 is formed to include a pair of upstanding stems, designated 44 and 46, respectively, in FIG. 3. Each stem 44, 46 is similar to a valve stem for an inner tube, but does not include an internal valve device.

A pair of openings 48, 50 are provided in the central portion of shelf 16. Stem 44 extends upwardly through opening 48 and stem 46 extends upwardly through opening 50. The stems 44, 48 may be externally threaded so that a retaining nut 47 may be screwed onto them from above the shelf 16. One of the stems 44, 46 is an inlet stem and the other is an outlet stem. In the illustrated embodiment, stem 44 is the inlet and stem 46 is the outlet stem.

A motive fluid inlet tube 52, forming a part of supply conduit means leading from a source of motive fluids, is attached to the portion of inlet stem 44 which stands up above shelf 16. In similar fashion, an exhaust tube 54, forming a part of an exhaust conduit means, is attached to the portion of stem 46 which stands up above the shelf 16. In the drawing, tube members 52, 54 are shown in the form of flexible hoses, and conventional hose clamps 56 are used for securing them to the stems 44, 46, respectively. In an arrangement such as this, the nuts 47 may be dispensed with, and the hose clamps 56 may be used to secure the inflatable tube member 42 to the bracket 12.

As will hereinafter be described in greater detail, an off-on [value] *valve* is provided in each supply conduit means, and another off-on valve means is provided in each exhaust conduit means. As will be apparent, when motive fluid is supplied into the inflatable tube 42 through its inlet stem 44, and the valve in the exhaust conduit means is closed, the tube 42 will be inflated to a size larger than the space for it between shelf 16 and water reaction panel 34. Since panel 16 is relatively rigid and substantially immovable, and since water reaction panel 34 is pivotally movable about the hinge 36, when the tube 42 is inflated, it bears against the action surface of panel 34 and forceably swings the panel 34 downwardly from a position substantially even with the undersurface of bottom 40 into a position wherein it slopes downwardly and rearwardly from the undersurface of the bottom.

During boat travel the water that flows relatively across the undersurface of a water reaction panel 34 is deflected downwardly thereby, creating an upwardly directed force component by water reaction, tending to lift the trim correction device 10 and the part of the boat to which it is secured. The water also tends to push the panel 34 upwardly, but such movement is resisted by the fluid in tube 42. However, when the valve in the exhaust conduit means is opened, and the supply of motive fluid is stopped, the water force can and will return the water reaction panel 34 to a position substantially even with the undersurface of bottom 40.

Figure 4:
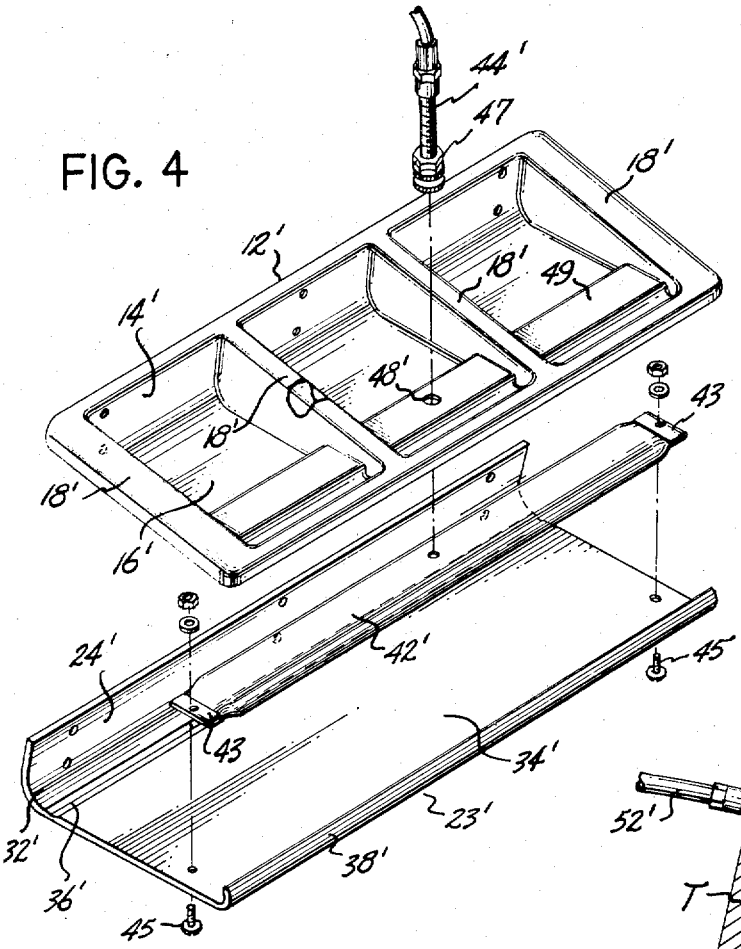
FIG. 4 is an exploded perspective view similar to FIG. 3, but of a modified form of trim correcting device, characterized by a dihedral support portion formed from sheet structural plastic, and reinforced by integral gussets, an expandable bladder in the form of an elongated tube, and a single fluid conduit connecting with said bladder.
Figure 5:
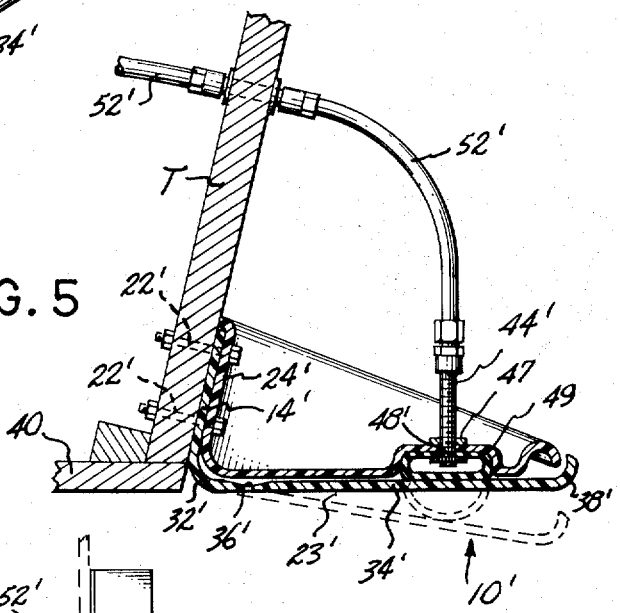
FIG. 5 is a view similar to FIG. 2, but of the FIG. 4 form of trim correcting device, such view being taken transversely through the trim correcting device substantially at the location of the fluid conduit connection to the bladder.

FIGS. 4 and 5 disclose a modified form of trim correcting device. It comprises a rigid mounting bracket 12' of dihedral form, and which is molded from a sheet of suitable structural thermoplastic into the shape illustrated. Such mounting bracket 12' includes a first panel part forming an upstanding mounting wall 14', a rearwardly extending, generally horizontal, second panel part forming a shelf 16', and a plurality *of* triangular gussets 18', of U-shaped cross-section. The gussets 18' extend between the mounting wall 14' and the shelf 16' and give rigidity to the mounting bracket 12'. The illustrated embodiment is shown to include a pair of gussets 18' at each side boundary of mounting bracket 12', and a pair of intermediate gussets 18'. The panel parts 14', 16' are substantially flat between the gussets, with a rounded corner being formed at the apex line where they meet in dihedral fashion.

As in the earlier form, a reactance or lift member 23' is mounted on the boat below bracket 12'. The reactance member 23' may include a generally upright forward wall 24' which is adapted to be positioned between the transom T and the upstanding panel part 14' of bracket 12'. A plurality of fastening bolts, some of which are designated 22', may extend through wall parts 14', 24' and the transom T, to secure both the mounting bracket 12' and the reactance member 23' on the transom.

In addition to front wall 24', the reactance member 23' comprises a narrow support strip 32' forming a near right-angle corner with wall 24', a generally horizontal (in use) water reaction panel 34', a hinge 36' interconnecting the water reaction panel 34' and the support strip 32' and a rear flange 38' upstanding from the rear edge of panel 34', and terminating substantially at level of, or somewhat above, panel part 16'. As best shown by FIG. 5, the trim correction device 10' is positioned outboardly of the boat, on and rearwardly of the transom T, with the water reaction surface of the lift member substantially at the level of the undersurface of the bottom 40.

As in the earlier form, bracket 12' and lift member 23' are preferably constructed from a synthetic resin of a type having good strength characteristics. The hinge 36' may be a reduced thickness portion of the material used to form lift member 23'. Support member 12' and reactance member 23' may both be molded into the configurations illustrated, in accordance with conventional sheet plastic thermo molding processes, for example:

In this form of the invention, the inflatable bladder 42' is preferably of a relatively narrow (e.g. about 2½ to 4 inches in diameter when inflated) section of tubing (about 24–36 inches in length, for example). The inflatable bladder 42' may be fabricated from a section of flexible hosing, such as used in collapsible fire hoses, for example. Such hosing is generally characterized by an impervious core of rubber or a rubber-like material covered by a jacket or covering of a strength-giving fabric such as nylon, for example. A bladder 42' may be constructed from such hosing by merely cutting a desired length of such hosing, then applying a suitable adhesive-sealant material to the inside end portions of such section of hosing, and then flattening out the end portions. The adhesive-sealant is used to hermetically seal the ends of the bladder 42'. A clamp 43 in the form of a piece of metal bent over on itself, so that it has a generally U-shaped cross-section, may be applied to the flattened out end portions of the bladder 42'. The end portions of bladder 42' may be secured to either the reactance member 23', or to panel part 16' of support member 12', such as by a bolt 45, for example. If end clamps 43 are used, the bolt 45 may be passed through the end clamp.

As illustrated a longitudinal recess 49, which in use extends transversely of the boat, may be molded into the support member 12', to serve as a partial restraining channel for the bladder 42', and to also serve as a further strengthening means for the support 12'.

In the FIGS. 4 and 5 embodiment, only a single fluid conduit is connected to the bladder 42'. The bladder 42' may be provided with an upstanding stem 44' which is similar to a valve stem for an inner tube, but does not include an internal valving device. An opening 48' is provided in the central portion of panel part 16', in the area of recess 49, and stem 44' extends upwardly through opening 48'. As in the earlier form, the stem 44' may be externally threaded so that a retaining nut 47' may be screwed on it from above the panel part 16'. The single stem 44' serves as both an inlet and an outlet for the bladder 42'. As in the earlier form a conduit or tube is attached to the portion of stem 44' which extends upwardly above panel part 16'. As will hereinafter be described in greater detail, a source of pressurized fluid is positioned inwardly of the boat, and the tube 52 extends forwardly from the stem 44' to and then through an opening in the transom T, and thence to an inboard control valve means.

Figure 6:
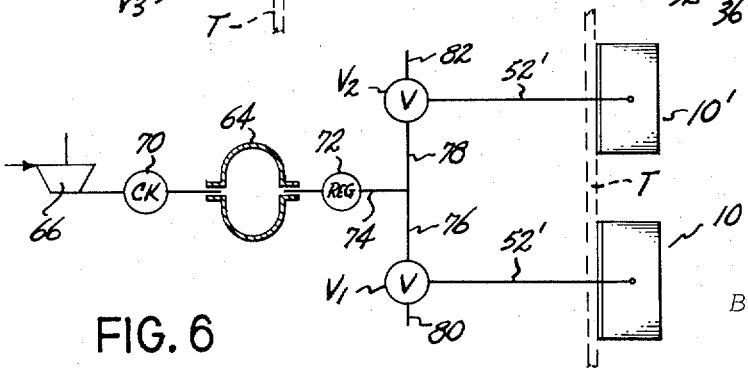
FIG. 6 is a schematic view of a typical fluid supply system, involving an inboard source of pressurized fluid connected to a pair of three way off-on valves, each of which is in a fluid line leading to a different one of a pair of outboard trim correction devices.

Referring now to FIG. 6, the source of pressurized fluid may be an air compressor or pump 66 (such as the model 840 air compressor manufactured by the Hadley Manufacturing Co., of Toledo, Ohio, for example) and a compressed air storage tank 64 (such as the model 751 air tank manufactured by the Hadley Manufacturing Co., for example). A check valve 70 is located in the inlet to the storage tank 64 leading from the compressor 66, and is adapted to permit compressed air to flow into but not out from the tank 64 through said inlet. The outlet of tank 62 includes a pressure regulator 72. An air supply line 74 leads from the regulator 72 and branches off into two branches or parts 76, 78. Branch 76 is connected to one port of a first three-way valve V1. The second port of valve V1, schematically designated 80, is in communication with the atmosphere, and it constitutes an exhaust passageway. The fluid conduit 52' from the port trim correcting device 10' is connected to the third port of the valve V1. Branch conduit 78 connects to the first port of a second three-way valve V2. Valve V2 also includes a second port (designated 82) in communication with the atmosphere, and a third port to which the forward end of the conduit 62' leading from the starboard trim correcting device 10' is connected. As will be evident, the three-way valves V1, V2 serve as a means for controlling each trim correcting device 10' independently of the other. Of course, both valves V1, V2 can be operated simultaneously so that both lift members 23' are lowered simultaneously when it is desired to raise the stem and lower the bow.

Figure 3:
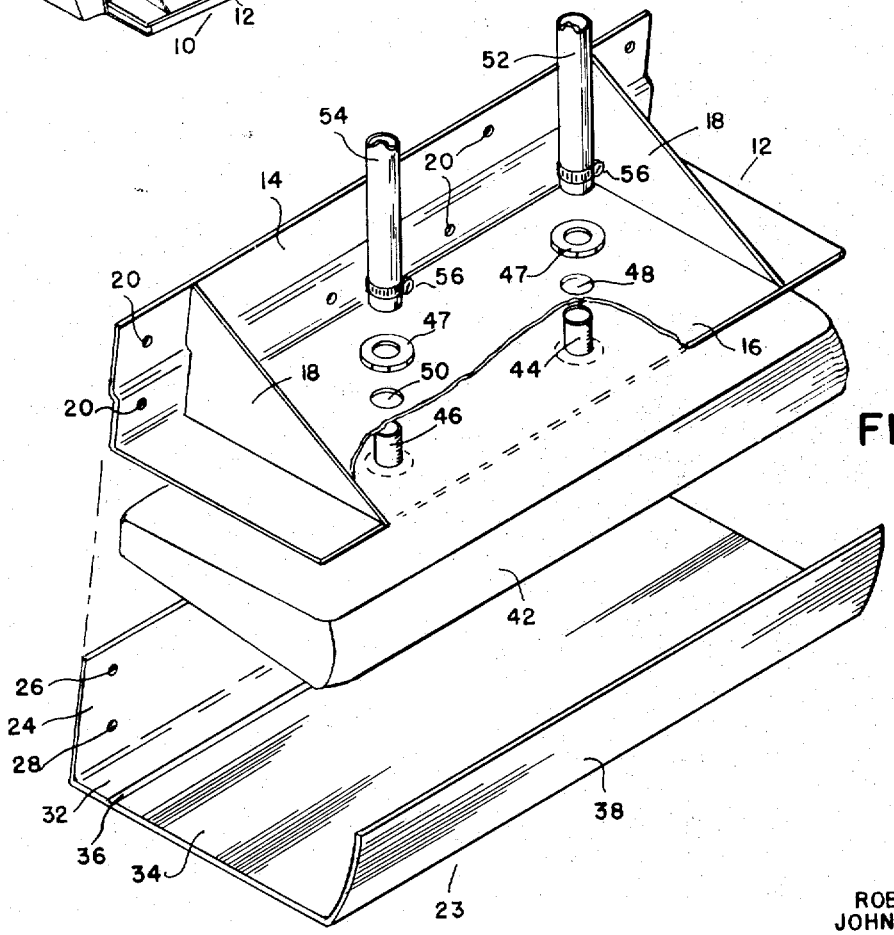
FIG. 3 is an exploded perspective view of one of the trim correcting devices, with the central rearward portion of the rigid shelf portion of its mounting bracket being cut away for clarity of illustration of the stem portions of the inflatable tube member.
Figure 7:
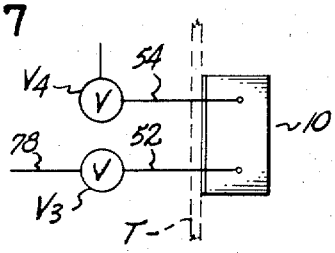
FIG. 7 is a schematic view of a modified fluid supply system, involving both an inlet conduit and an outlet conduit leading respectively into and out from the bladder, with a valve in each conduit.

FIG. 7 shows an alternative arrangement, associated with the embodiment of FIGS. 1–3, and involving two two-way valves and separate inlet and outlet conduits for each trim correcting unit 10. Branch 78 of air supply line 74 is shown connected to inlet conduit 52 for the unit 10 by a first two-way valve V3. A second two-way valve V4, which discharges to the atmosphere, is provided in the exhaust conduit 54. As will be evident, when it is desired to inflate bladder 42, valve V4 is closed and valve V3 is opened. When it is desired to deflate bladder 42, valve V3 is closed and valve V4 is opened.

Valves V1, V2, V3, V4 may be manually, electrically, mechanically, or pneumatically controlled. Such valves may also be automatically controlled, such as by the automatic control apparatus forming the subject matter of our aforementioned U.S. application, Ser. No. 488,705 *now U.S. Patent No. 3,298,344, granted Jan. 17, 1967,* for example.

As will readily be apparent, during the exhausting procedure the tubes 42, 42′ in effect function as dashpots or shock absorbers. Since the release of compressed air from the tubes 42, 42′ is not sudden, but rather occurs relatively slowly over a period of time, the movement of the water reaction panels 34, 34′ is not sudden and jerky, but rather is slow, resulting in a smooth transition from one attitude of the boat to the next, by operation of the trim correcting devices 10, 10′.

As previously mentioned, bracket 12, 12′ and reactance member 23, 23′ are both preferably constructed from a synthetic resin, a typical example of the resin being polymerizable unsaturated polyester. The inflatable tubes 42, 42′ is basically constructed from rubber or a rubber-like resilient material. The stems 44, 44′, 46 are constructed from or at least covered with rubber or a similar material, or are brass or copper. Tubes 52, 52′, 54 are preferably rubber, plastic, nylon or some other non-metallic material. The nuts or retaining elements 47, 47′ if used, may be made from nylon, plastic, or a similar material. All of the above-mentioned materials are non-corrosive. They will not corrode themselves and their use minimizes the corrosion of the metallic fastener elements 22, 22′, 30 and the metallic hose clamps 56. These components 22, 22′, 30, 56 are subject to oxidation because they are made of metal, but they do not contact and are not situated in close proximity to another metallic part. Consequently, the conditions necessary for the occurrence of galvanic corrosion are not present, and essentially no galvanic corrosion occurs. This is a very important feature of the present invention because galvanic corrosion is much more destructive then simple oxidation.

The valves V1, V2, V3, V4 are located inside of the boat, forwardly of the transom T. An opening is provided in the transom T for each of the tube members 52, 52′, 54. Each tube member 52, 52′, 54 may be continuous and extend through its opening in the transom. Alternatively, a through hull fitting of nylon, for example, may be provided at each opening, and each tube 52, 52′, 54 may be made into sections, a forward section interconnecting between the related valve and the forward end of the fitting, and a rearward section interconnected between the rearward portion of the fitting and the portion of the related stem that projects above the support shelf 16, 16′.

Figure 8:
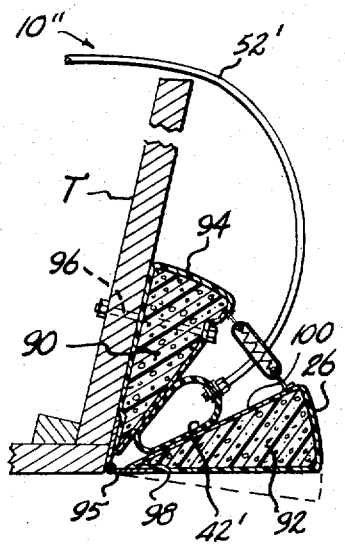
FIG. 8 is a view similar to FIGS. 2 and 5, but of still a further embodiment, such embodiment being characterized by a butt hinge mounted member having a foam core and a sheet plastic jacket.

FIG. 8 shows still a further modified form of trim correcting device according to the present invention. Such form is shown to comprise a pair of similar, and perhaps identical, wedge-shaped blocks 90–92 of foam plastic (such as closed cell Styrofoam) covered by a sheath or jacket 94, 96 of a tough and substantially impervious sheet plastic material, and interconnected at their apexes by means of an elongated butt hinge similar to a piano hinge, for example, but of a sturdy construction and fabricated from brass, stainless steel, or other *material. Block 90 is*

*attached to the* transom T, such as by a plurality of bolts, one of which is designated 96 in FIG. 8. The other block 92 constitutes the reactance or lift member and comprises a lower water reaction surface 98 and a relatively upper action surface 100. An inflatable bladder 42′, which may be like bladder 42′ of the FIGS. 4 and 5 embodiment, is restrained between the blocks 90–92. A sheathed spring (or springs), or the like, may be interconnected between the rear portion of the blocks 90–92, to serve as a means for preventing the lower block from gravitating to vertically down position when the boat is at rest in the water. Bladder 42′ may be provided with the pressurized fluid control system of FIG. 6, including a single fluid conduit 52′, or in the alternative with supply system shown by FIG. 7, including a pair of conduits 52, 54. The bladder 42′ may be arranged to press directly against the rear side of the transom T, in place of block 90, or against any other member attached to the transom T.

Owing to tis construction, the elongated tubular bladder 42′, when inflated, has an oval cross-sectional shape, tending toward round. The natural tendency of bladder 42′ is to acquire a round cross-sectional shape when inflated, but some flattening occurs due to the loading put on bladder 42′ by the lift member. The bladder 42′ may be restrained at its ends, but it is not restrained against expansion or contraction between its ends. It is not cemented or otherwise secured to either the action surface of the lift member or the adjoining surface of the support member (e.g. member 16′), so that it may tend to assume a round or near-round shape. The advantage of this arrangement is that a round shape gives the maximum amount of lift member displacement (i.e. the diameter of the bladder 42′) for the least amount or volume of air.

Having thus described the invention, it is clear that the objects as stated above have been attained in a simple and practical manner. While particular embodiments of the invention have been shown and described, it is to be understood that changes may be made in the construction and arrangement of the various parts without departing from the sphere and scope of the invention as expressed in the following claims.

What is claimed is:

1. For use on a boat having a transom and a bottom, an outboard trim correcting device connectable to said boat generally rearwardly of said transom, and including a rigid, rearwardly extending support portion, a water reaction panel positioned below said support portion, and including hinge means for connecting a forward portion of said panel to the boat, substantially at the level of the bottom, and substantially where said bottom joins the boat transom, and an elongated bladder of tubular form extending transversely of the boat and angularly disposed between said transom and said water reaction panel, and between said support portion and said water reaction panel, and including means closing and hermetically sealing both of its ends, and a stem portion extending upwardly from an intermediate portion thereof, and through an opening in said support portion; a source of pressurized fluid positionable inboardly of the boat; conduit means for interconnecting between the inboard source and the stem of the outboard inflatable bladder; and inboard control valve means in said conduit means, to control the ingress and egress of fluid to and from said inflatable bladder.

2. An outboard trim correcting device according to claim 1, wherein said support portion includes a downwardly opening recess extending parallel to, and rearwardly of said hinge means, and wherein an upper portion of said inflatable bladder is nested in said recess.

3. An outboard trim correcting device according to claim 1, wherein said support portion is of dihedral form is formed from sheet plastic, and comprises dihedrally related first and second panel parts joined together along an apex line, and a plurality of strengthening gussets spaced along said member and interconnecting between said panel parts, to provide rigidity to said dihedral member, said gussets being generally U-shaped in cross-section, and wherein one of said panel parts is securable to the transom of a boat and the elongated section of flexible tubing contacts the other panel part, on the side thereof opposite the gussets.

4. In an outboard trim correcting device connectable to a boat generally rearwardly of its transom, an elongated dihedral member formed from sheet plastic and comprising dihedrally related first and second panel parts joined together along an apex line, and a plurality of strengthening gussets spaced along said member and interconnecting between said panel parts, to provide rigidity to said dihedral member, said gussets being generally U-shaped in cross-section; means for connecting said dihedral member to a boat, with its apex line positioned adjacent, and generally parallel to, the lower edge of the boat's transom; and an elongated section of flexible tubing extending along and contacting one panel part of said dihedral member, on the side thereof opposite the gusset, and at a location offset from said apex line, said section of tubing including means closing and hermetically sealing same and at least one conduit connection.

5. The combination of claim 4, further including means for affixing said flexible tubing in position comprising a connector for restraining at least one end of said tubing, with at least the largest part of said tubing between its ends being unrestrained against expansion and contraction.

6. For use on a boat having a transom and a bottom, an outboard trim correcting device connectable to said boat, and including a lift member formed from a structural plastic, and having a lower water reaction surface and a forward portion, transverse hinge means for connecting the forward portion of said member, and hence the member itself, to the boat, substantially at the level of the undersurface of said boat and substantially where said undersurface meets said transom, an inflatable bladder of elongated tubular form to be disposed transversely of the boat, and against a surface of said lift member situated above said water reaction surface, and including means closing and hermetically sealing same; a source of pressurized fluid positionable inboardly of the boat; conduit means interconnectable between said source and said inflatable bladder; and control valve means in said conduit means, to control the flow of fluid into or out from said inflatable bladder, with flow of [air] *fluid* into said bladder serving to inflate it into an oval cross-sectional shape tending towards round, and with said inflated bladder pressing against the adjacent surface portion of said lift member, and swinging said lift member into a position wherein its lower water reaction surface slopes downwardly and rearwardly from the bottom of the boat.

7. An outboard trim correcting device according to claim 6, in combination with a boat in which said source of compressed fluid is inboardly located, forwardly of the boat's transom, and wherein said conduit means includes only a single conduit connecting with said inflatable bladder, and said conduit extends from a connection with said inflatable bladder forwardly through an opening in the boat's transom.

8. An outboard trim correcting device according to claim 6, wherein said inflatable bladder is a section of flexible hosing, the two ends of which have each been closed by flattening of the end portions of said hosing, and said inflatable bladder includes means for hermetically sealing said closed, flattened end portions.

9. In combination, a boat having a bottom and a transom with a transverse lower edge; a pair of outboard lift members, one on each side of the center line of the boat, rearwardly of said transom, and each having a lower water reaction surface and an action surface thereabove, each lift member being hinged generally along its forward [extend] *extent* to the boat, substantially at the lower edge of the transom; and an inflatable bladder for each lift member, extending transversely of the boat generally parallel to the hinge line and contacting the action surface of its lift member, radially outwardly from the hinge line, and operable to swing the lift member downwardly from an inactive position, wherein its reaction surface is substantially even with or above the undersurface of said boat, into an active position wherein the water reaction surface thereof slopes downwardly and rearwardly from the undersurface of said bottom, each said bladder being of elongated tubular form and including means for closing and hermetically sealing each of its ends; a source of [pressurized] *pressure* fluid inboardly of the boat; conduit means interconnected between said inboard source and said outboard inflatable bladders, and including at least one conduit leading to each inflatable bladder; and inboard control valve means in said conduit means for independently controlling the flow of fluid into or out from each of said inflatable bladders.

10. The combination of claim 9, wherein said inboard control valve means comprises a pair of three-way valves, each having a first port communicating with said source; a second port communicating with the atmosphere, and a third port, and wherein said conduit means includes a single conduit leading from each inflatable bladder forwardly through an opening in the transom to the third port of the related three-way valve.

11. The combination of claim 9, wherein said conduit means includes a separate supply conduit leading from said source to each inflatable bladder, and a separate exhaust conduit leading from each inflatable bladder to said inboard control valve means, and wherein said control valve means includes off-on valve means in each supply conduit and off-on valve means in each exhaust conduit.

12. In combination, a boat having a transom and a bottom; a trim correcting device comprising a bracket connectable to said transom, and including a rigid, rearwardly extending support portion; a water reaction panel positioned below said support portion, and hinged along its forward edge to the boat substantially at the level of the undersurface of said bottom; an inflatable tube means disposed between said support portion and said water reaction panel, and including an inlet stem portion extending upwardly through a first opening in said support portion, and an outlet stem portion extending upwardly through a second opening in said support portion; a source of motive fluid; supply conduit means interconnected between said source and said inlet stem, for supplying motive fluid from said source into said inflatable tube means; exhaust conduit means leading from each outlet stem; off-on valve means in said supply conduit means; and off-on valve means in said exhaust conduit means.

13. The combination of claim 12, wherein a flange extends upwardly from the rear edge of the water reaction panel and terminates substantially at the level of the support portion of said bracket.

14. The combination of claim 12, wherein a pair of openings is provided in the transom above the trim correcting device, wherein the off-on valve means in the supply conduit means, and the off-on-valve means in the exhaust conduit means, are both located forwardly of the transom, wherein the supply conduit means include tube means extending rearwardly from the off-on valve means in the supply conduit through one of the openings in the transom and then to a connection with the said inlet stem at a location above the support portion of said bracket, and wherein the exhaust conduit means includes tube means extending rearwardly from the off-on valve means in the exhaust conduit means through the second opening in the transom and then to a connection with the said outlet stem at a location above the support portion of said bracket.

15. The combination of claim 12, wherein the water reaction panel is a part of a reactance member that also includes an upstanding front wall by which it is secured to the transom of the boat, narrow support strip extending rearwardly from the lower portion of said front wall, and hinge means interconnecting said support strip with said water reaction panel, wherein said reactance member is constructed from a synthetic resin, and wherein the hinge means consists of a reduced thickness portion of the reactance member which is flexible relative to the thicker support strip forwardly thereof and the thicker water reaction panel rearwardly thereof.

*16. Trim correcting apparatus comprising:*

*a pair of lift members connectible to a boat in the region of its stern, one on each side of the center line of the boat, each lift member being elongated transversely of the boat and having a lower water reaction surface and an action surface thereabove, and each being swingably connected to the boat along its forward extent generally at the level of the undersurface of the boat, and an elongated, inflatable bladder for each lift member extending transversely of the boat, and when inflated being operable to swing the lift member downwardly from an inactive position wherein its reaction surface is substantially even with the undersurface of said boat into an active position wherein the water reaction surface thereof slopes downwardly and rearwardly from the undersurface of said bottom, each said inflatable bladder being a length of tubing which when inflated assumes an oval cross-sectional shape tending towards round, and which includes strength giving fabric limiting the tubing to a predetermined inflated diameter;*

*a source of pressure fluid inboardly of the boat;*

*conduit means interconnected between said source and each said inflatable bladder, and including at least one conduit leading to each inflatable bladder; and*

*inboard control valve means in sale conduit means for independently controlling the flow of fluid into and out from each of said inflatable bladders.*

*17. Trim correcting apparatus according to claim 16, wherein each said lift member is fabricated from a noncorrosive structural plastic material, and each said bladder is fabricated from a noncorrosive material.*

*18. Trim correcting apparatus according to claim 16, wherein each lift member is a generally rectangular sheet material panel having a forward portion rigidly connected to the boat, and wherein said panel is deflected downwardly rearwardly of its line of connection when the bladder is inflated.*

*19. Trim correcting apparatus according to claim 18, wherein a generally horizontal support surface is offset upwardly from the normal under surface of the boat at a location rearwardly of where said lift member is attached to the boat, and said elongated bladder is located vertically between said support surface and the lift member and rearwardly of where said lift member is connected to the boat.*

References Cited

The following references, cited by the Examiner, are of record in the patented file of this patent or the original patent.

UNITED STATES PATENTS

| | | | |
|---|---|---|---|
| 3,026,839 | 3/1962 | Fridge | 114—66.5 |
| 3,058,442 | 10/1962 | Curtis | 114—66.5 |
| 2,265,206 | 12/1941 | Stampfl | 114—66.5 |
| 3,177,837 | 4/1965 | Sherrill | 114—66.5 |
| 3,298,344 | 1/1967 | Yunker et al. | 114—66.5 |

ANDREW H. FARRELL, Primary Examiner